United States Patent

[11] 3,569,665

| [72] | Inventor | Nathaniel E. Hager, Jr.<br>Lancaster, Pa. |
|---|---|---|
| [21] | Appl. No. | 811,539 |
| [22] | Filed | Mar. 28, 1969 |
| [45] | Patented | Mar. 9, 1971 |
| [73] | Assignee | Armstrong Cork Company<br>Lancaster, Pa. |

[54] FIXED TEMPERATURE, RAPID RESPONSE, HIGH ENERGY HEATING DEVICE
8 Claims, 2 Drawing Figs.

[52] U.S. Cl............................................. 219/200,
219/243, 219/241, 219/227, 219/358
[51] Int. Cl........................................................ H05b 1/00,
F24h 9/02
[50] Field of Search............................................ 219/243,
494; 219/345, 354, 358, 228, 229, 241

[56] References Cited
UNITED STATES PATENTS

| 1,137,573 | 4/1915 | Carr............................ | 219/236 |
| 1,609,920 | 12/1926 | Whited........................ | 219/227 |
| 3,118,042 | 1/1964 | Parker......................... | 219/358X |
| 3,444,456 | 5/1969 | Codichini..................... | 219/494X |

Primary Examiner—A. Bartis
Assistant Examiner—L. H. Bender
Attorney—Theodore L. Thomas ABSTRACT: A rapid response heating device employing a heat funneling principle combined with minimal thermal resistances for attaining heat fluxes up to 50 kw/ft$^2$ and for maintaining a fixed temperature at the output working surface despite large changes in thermal load. The device is heated with an electric foil heater having its power input regulated by a control device responsive to temperature changes within said device and has a large heat input area as compared with a small heat output area.

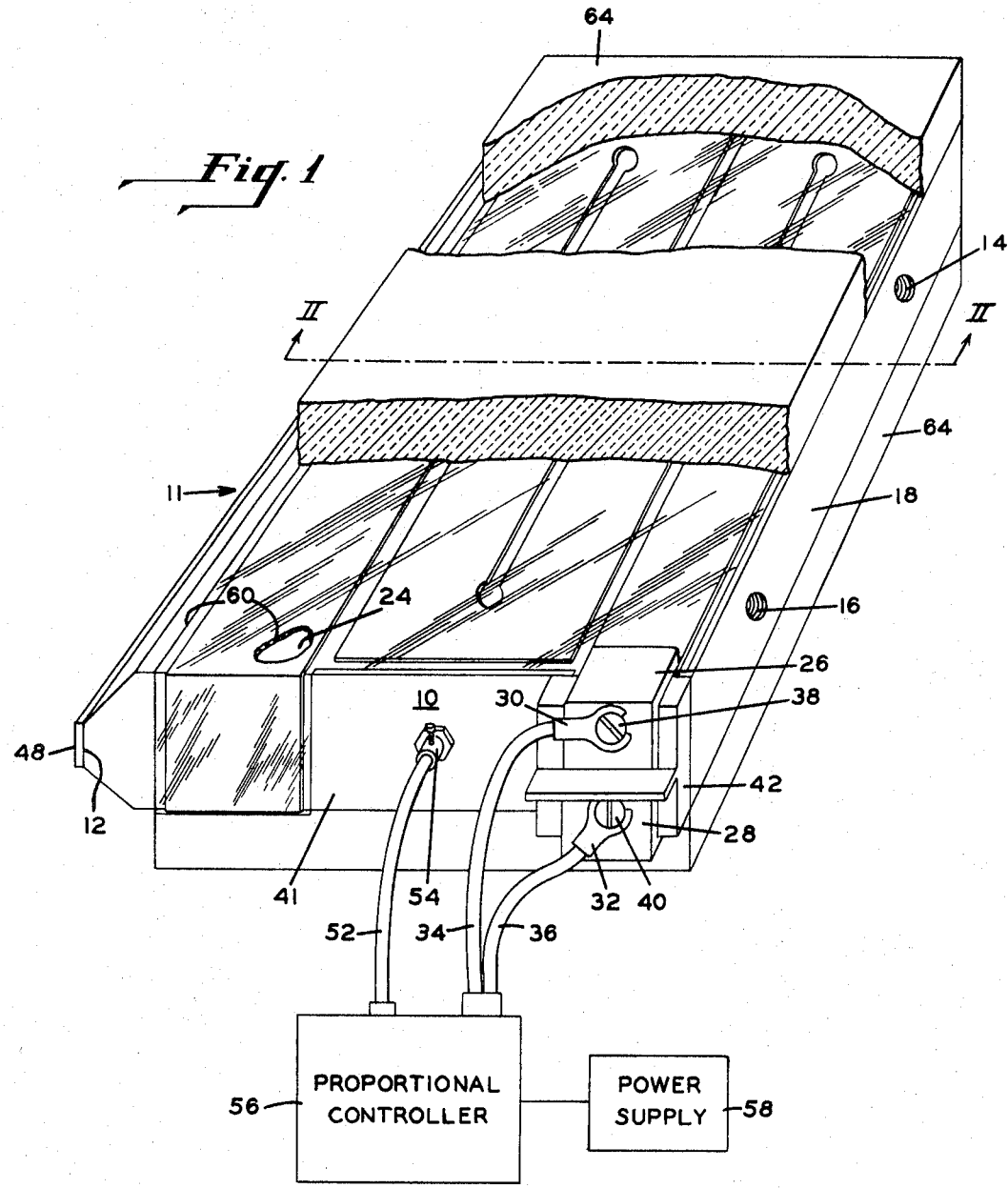

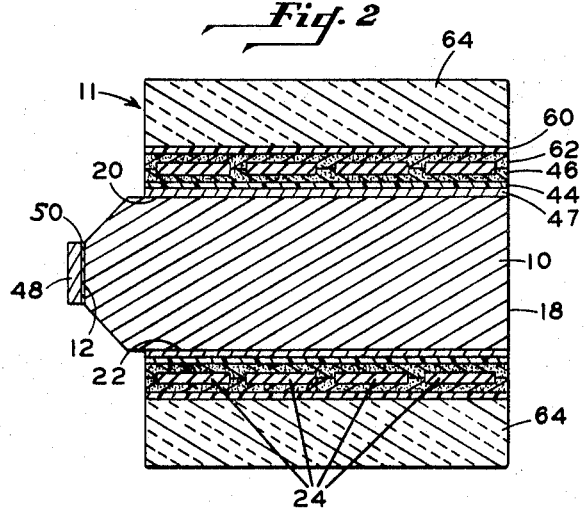

FIXED TEMPERATURE, RAPID RESPONSE, HIGH ENERGY HEATING DEVICE

BACKGROUND OF THE INVENTION

1. Field of the Invention

This invention involves an electrical device adapted to put out a highly concentrated flow of thermal energy for evaporating water. More particularly, this invention is concerned with a rapid response heating device capable of producing heat fluxes up to 50 kw./ft.$^2$ for removing water from fibrous products in the nature of boards or tiles and maintaining a fixed temperature at the work-contacting area.

2. Description of the Prior Art

Prior art heating devices capable of producing large enough heat fluxes to evaporate water from fibrous products are often of a cartridge type wherein commercially available electric heater cartridges are inserted into receptacles within the heating device. Because of the poor thermal coupling, and hence, the large thermal resistance between the heater cartridges and the heating device, the cartridges must run near their burnout temperature with a resultant normally short life.

U.S. Pat. No. 1,609,920, Whited, describes a portable electric lumber grade marking device. A heat funneling principle is used in the patented device. Input heat is supplied over the major portions of the surface area of the body defined by its width which is parallel to the heat flow in the body and its length which is parallel to the marking surface. The heat is then conducted through the cross-sectional area of the body defined by its length and thickness which is substantially smaller than the heat input area. The heat fluxes in the cross-sectional area are greatly increased from those in the surface area.

However, even though this heat funneling is shown in the patented device, it does not teach the use of such heat funneling for high energy heating devices having output heat fluxes up to 50 kw./ft.$^2$. Because the heat flow path in the body of the patented device is so narrow and so long, the body offers substantial resistance to the flow of heat, and therefore, much of the advantage of the heat funneling effect is lost.

To use such high heat fluxes creates such a large temperature gradient through the body of the device that a foil heater over the input surface area would have to operate at a temperature so much greater than the output temperature that it could not be adhesively secured to the body. If the foil heater were not adhesively secured to the body, then the thermal resistance therebetween would be greater and the foil heater would have to run at a still higher temperature.

This is pointed out by the fact that the width: thickness ratio of the body of the patented device as measured from the drawing is 24:1 and is greater by nearly a 5 factor than the maximum width: thickness ratio of 5:1 in the present invention. This ratio is proportional to the thermal resistance of the heat flow through the body, and therefore, also proportional to the temperature gradient through the body. Hence, this is a very significant factor.

A heat defunneling principle is used in the last stage of the patented device since the heat is transferred from the cross-sectional area of the body to the work-contacting area which has an increased area. This serves to decrease or defunnel the heat flux rather than concentrate or funnel the heat flux as is accomplished in the last stage of the present invention. By defunneling the heat at the output, the heat fluxes in the body must be greater by that factor by which the heat is defunneled, and as previously mentioned, these high heat fluxes lead to a high temperature gradient which becomes a very significant factor.

U.S. Pat. No. 1,137,573, Carr, describes a pyrographic needle utilizing the soldering iron principle of having a heater surround a portion of the body opposite the output, a point or line type area. Again, this patent does not teach the use of heat funneling in a device having output heat fluxes of the magnitude of the present invention. The heat flux requirements of this patented device or of a soldering iron are normally smaller than those of the present invention. Also, there usually is no requirement that the patented device or a soldering iron maintain on a continuous basis an output temperature within a critically narrow range as is required of the present invention.

SUMMARY OF THE INVENTION

The primary object of this invention is to present a heating device utilizing a heat funneling principle and minimal thermal resistances for attaining high heat fluxes and a fixed temperature at the output work-contacting area.

Another object of this invention is to present a heating device with a peak internal temperature as low as possible, but still with the capability of evaporating water.

Another object of this invention is to present a heating device with rapid response to changes in thermal demand.

This invention relates to a heating device for evaporating water from the bevels of fibrous products in the form of board or tiles on a conveyor. The heating device utilizes a heat funneling principle which introduces heat over a large area at a comparatively low heat flux and withdraws heat from a small area at a high heat flux. This principle is used in conjunction with minimal thermal resistances to attain heat fluxes in the range of 10 to 50 kw./ft.$^2$ and to maintain a fixed temperature at the heat output work-contacting area.

The body of the heating device has a generally rectangular bar shape. The body's thermal conductivity is kept high to minimize its thermal resistance and, therefore, also its temperature gradient.

A serpentine foil electric heater substantially covers at least the major surfaces of the body. An electrical insulating film is positioned between and adhesively secured to said foil heater and said body. Said layers of film and adhesive also provide a thermal resistance between the foil heater and the body. This thermal resistance is minimized so that the temperature gradient thereacross is also minimal.

The heat output work-contacting area is less than the heat conducting area, and hence, serves as the last stage of heat funneling in the heating device. An abrasion resistant layer is fastened to said heating device to lengthen the body's life. The thermal resistance of the fastening means and the abrasion resistant layers is also minimized so that the temperature gradient thereacross is low.

By holding the thermal resistances throughout the heating device to a minimum and, therefore, also the temperature gradients, the foil heaters can be run at a temperature which polymer adhesives can withstand even though the fixed output operating temperature is above the boiling point of water.

A temperature detector is embedded in the body of the heating device. The temperature changes detected are fed to a proportional controller which is fed by a conventional power supply. The proportional controller is responsive to these temperature changes to vary the power supplied to the foil heater in proportion to the heat needed to maintain a fixed temperature at the output work-contacting area.

BRIEF DESCRIPTION OF THE DRAWINGS

FIG. 1 is a perspective view of one form of this invention wherein one layer of thermal insulation is partially broken away to show the serpentine foil electric heater.

FIG. 2 is a cross-sectional view along line II–II of FIG. 1 showing one form of the heating device of this invention wherein the electrical insulation films, the adhesive layers, and the foil electric heater are expanded to show the details thereof.

DESCRIPTION OF THE PREFERRED EMBODIMENTS

The body 10 of the heating device 11 of the present invention is that portion of the heating device through which heat flows from the heat input to the heat output areas. The body is generally rectangular except in the heat output work-contacting area 12 where, for special requirements, the corners have been beveled. The shape of the body 10 is that of a bar wherein its width dimension is parallel to the direction of heat flow through the body and perpendicular to the cross-sectional area of said body as defined by its length and thickness. The width:thickness ratio of the body is in the range of 1:1 to 5:1, and more preferably, in the range of 2:1 to 3:1.

Mounting holes 14 and 16 are drilled and tapped in the body on the longitudinal edge surface 18 of the body which is opposite the longitudinal edge of the body which defines the heat output work-contacting area 12. These mounting holes are used to fasten the heating device relative to the edge of a fibrous product in the nature of boards or tiles which product is being heated to evaporate water.

The thermal conductivity $k$ of the body is a constant dependent on the material used for the body. The higher the value of the thermal conductivity, the lower will be the thermal resistance. The material of the body should have a thermal conductivity $k$ at least 1,000 B.t.u.–in./hr.–ft.$^2$– F. Examples of such material are copper and aluminum. The thermal conductivity of the body of this invention which is copper is 2,500 B.t.u.–in./R)–ft.$^2$– F. The body 10 is chromium plated for copper oxidation control.

The major surfaces of the bar-shaped body 10 are at least those surfaces 20 and 22 which are defined by the body's length and width whenever the width:thickness ratio is greater than 2:1. As the width:thickness ratio approaches 1:1, the longitudinal edge surface 18 defined by the body's length and thickness can also be considered a major surface.

The heater 24 is a metallic foil which generates heat when current flow therethrough. The configuration of the heater is that of a back-and-forth conductive path known as the serpentine configuration. By using such a serpentine configuration, one foil heater can be used to substantially cover at least the major surfaces by having the heater wrap around one end of the body, as defined by its width and thickness, from one major surface to the second major surface.

The metallic foil from which the foil heater is constructed may be of the metal foils such as copper, steel and other alloys. Heater 24 of this invention uses stainless steel foil 0.0017 in. thick although other thicknesses from 0.0005 to 0.005 in. could be used. The opposite ends of the heater have stainless steel tabs 26 and 28 welded thereto. Said tabs 26 and 28 are placed on the glass insulating block 42. Said block 42 is fastened to the end surface 41 of body 10 and has one edge thereof flush with longitudinal edge surface 18. The glass insulating block electrically insulates the ends of the stainless steel tabs from the body of the heating device and from each other. The terminals 30 and 32 of the power leads 34 and 36, respectively, are placed in contact with steel tabs 26 and 28 respectively. Any conventional fastening means such as screws 38 and 40 may be used to fasten the respective terminals 30 and 32 to the respective stainless steel tabs 26 and 28 and also to the glass insulating block 42.

The heaters are used to introduce heat into the body employing a heat funneling principle. The heat funneling principle simply stated is the introduction of heat over a large area, such as the major surfaces 20 and 22 in this invention, at a comparatively low heat flux and a heat output over a small area, such as the output work-contacting area 12 at a high heat flux. Thus, a large amount of heat can be introduced into the body of the heating device at a comparatively low heat flux.

The heating device has an electrical insulating film 44 of polyimide positioned between the heater 24 and the body 10 to electrically insulate said heater from said body. This insulation film 44 should be as thin as is possible without permitting electrical breakdown of the film and short circuiting of the foil to the body. Commercial polyimide films such as Kapton H-Film and Silicone Glass Laminate, 011617 electrical insulations DuPont and General Electric respectively are examples of such films. Said electrical insulation film 44 is adhesively bonded to the heater 24 with a first adhesive layer 46. Said film 44 is also adhesively bonded to the body 10 but with a second adhesive layer 47. Adhesive layers 46 and 47 are the same adhesive and must be able to withstand temperatures in the range of 70° to 500° F. without breaking down adhesively. An example of an adhesive capable of withstanding such a temperature range is Silicone Adhesive 0281 adhesive of Dow Corning.

Electrical insulators are generally good thermal insulators, and electrical insulation film 44 is no exception. The adhesive layers 46 and 47 along with film 44 function as a thermal insulation between the heater 24 and the body 10. In order for the heating device to function properly to be able to achieve the objects of this invention, the ratio of the total thickness of the electrical insulation film 44 and the adhesive layers 46 and 47, where the thickness is measured in inches, to the effective thermal conductivity of said layer in B.t.u.–in./hr.–ft.$^2$–° F. is in the range of 0.0002 to 0.02 hr.–ft.$^2$–° F./B.t.u. The effective thermal conductivity $K_{eff}$ of said layers is defined by the following $$= -R_s/R_d \times V_{ref} \times R_s/R, \text{ if } R_s d_3/k + \ldots d_n/k$$

$n$.) where $d$ is in inches and $k$ is in B.t.u.–in./hr.–ft.$^2$–° F. $d_{total}$ in this invention represents the total thickness of the electrical insulation film 44 and the two adhesive layers 47 and 47; $d_1$ represents the thickness of any one of these three layers and $k_1$ represents the thermal conductivity of this same layer; $d_2$ represents the thickness of another one of these three layers and $k_2$ represents its respective thermal conductivity; $d_3$ represents the remaining layer's thickness and $k_3$ represents its respective thermal conductivity.

This ratio of thickness to thermal conductivity is proportional to the thermal resistance R where $R = d/k \cdot A$. A represents the surface area of the material whose thickness is $d$. As the ratio of thickness to thermal conductivity increases for a constant area, the thermal resistance of such a layer also increases with a resultant increased drop in temperature across the layer. Therefore, to be able to operate the heater as nearly as possible to the heat output work-contacting area temperature, the temperature gradient across the layer of electrical insulation film 44 and adhesive layers 46 and 47, must be as small as is practically possible in view of minimum thickness needs for adhesion. Hence, this is the reason for having the ratio of the total thickness of the electrical insulation film 44 and adhesive layers 46 and 47 to the effective thermal conductivity of said layers in the range of 0.0002 to 0.02 hr./ft.$^2$–° F./B.t.u. The usual range for this ratio in existing models is 0.001 to 0.01 hr./ft.$^2$– F./B.t.u.

A heat output work-contacting area 12 runs along one longitudinal edge of the body 10. Although the heat output work-contacting area may be the edge of the copper body 10, it is preferable to fasten an abrasion resistant layer 48 to this area because of the abrasive characteristic of fibrous products in the form of boards or tiles which come into contact with the work-contacting area when water is being evaporated therefrom. An example of such an abrasion resistant layer is tungsten carbide. Commercially available tungsten carbide which functions well as this abrasion resistant layer is Grade WA2 Tungsten Carbide of the Walmet Company and Grade 883, "Carballoy" of General Electric. The tungsten carbide is fastened to the work-contacting area 12 with a ribbon type sandwich material 50 comprising silver solder and copper. The tungsten carbide is in small pieces several inches in length. The purpose of small tungsten carbide pieces fastened with a sandwich material of silver solder and copper is to allow for the different expansions of the carbide and copper so as not to break the carbide.

The thickness to thermal conductivity ratio of the abrasion resistant layer and its fastening means must be in the range of 0 to 0.005 hr.–ft.$^2$–° F./B.t.u. which, as previously stated, is directly proportional to the thermal resistance of this layer for a constant area. Therefore, by keeping the thickness to thermal conductivity ratio in this stated range, the thermal resistance will not become too large and, accordingly, the temperature drop across this layer will not become too great.

A platinum wire resistance element 52 for detecting temperature changes is embedded in the body through a conventional connector 54. The end of said resistance element 52 which is embedded furtherest in the body 10 of the heating device 11 nearly centrally located in each of the length, width and thickness dimensions of the heating device. Although the platinum wire resistance element is preferred as the sensing element for detecting temperature changes, other sensing elements such as thermistors or thermocouples may also be used. The temperature changes detected by said resistance element within the body of the heating device are very near to the temperature changes at the work-contacting area in time relationship because of the high termal diffusivity of the copper body.

The temperature changes detected by the resistance thermometer are fed into a proportional controller 56 which has conventional 120 volt power supplied by the power supply 58. The proportional controller which is an Athena, Model 61, proportional controller supplies power through power leads 34 and 36 to the stainless steel tabs 26 and 28, respectively, on the ends of the foil heater 24. Although the Athena, Model 61, proportional controller is preferable, any other conventional proportional controller such as the Dynapac, or those manufactured by Minneapolis-Honeywell or Leeds and Northrup which meets the needs of the heating device may be used. The power fed by the proportional controller 56 to the foil heater 24 is always proportional to the power needed by the foil heater to supply the necessary heat to the body 10 to maintain a fixed temperature at the work-contacting area 12.

When a fibrous product in the form of boards or tiles having water to be evaporated therefrom comes in contact with the work-contacting area 12 of the body, or the abrasion-resistant layer 48, the temperature at the work-contacting area tends to fall slightly. This effect is rapidly transmitted through the copper body 10 because of its high thermal diffusivity Therefore, the temperature deviation is rapidly detected by wire resistance element 52 which is nearly centrally embedded within the body. The effect of said deviation in temperature is then relayed to the proportional controller 56 which increases its power output to the foil heater 24. This increased heat flux in turn counters the tendency for the temperature of the body of the heating device and that of the work-contacting area to fall. The proportional controller 56 will continue to supply power to the heater 24 until the temperature detected by the wire resistance element 52 reaches the predetermined value as fixed by the operating temperature established for the work-contacting area 12.

If a fibrous product in the nature of boards or tiles in contact with the work-contacting area is stopped beneath the heating device, and all the water therein has evaporated, the temperature of the work-contacting area 12 will tend to rise. This tendency for temperature rise is rapidly detected by the resistance element 52 embedded within the body 10 and is transmitted to the proportional controller 56. The proportional controller therefore lowers its power output to the heater in proportion to the tendency for temperature rise above the predetermined operating temperature. This decreased power to the heater therefore keeps the temperature from deviating above the upper limit of the critically narrow operating temperature range above which the fibrous product in the nature of boards or tiles would become visibly or invisibly scourched with resultant ruination and scrapping thereof.

An electrical insulation film 60 of polyimide may be secured with an adhesive layer 62 to the outer surface of the foil heater 24 and to any adhesive 46 between and around the edges of said foil heater. The electrical insulation film 60 must electrically insulate the foil heater 24 from personnel and any metal objects or tools which may be used therearound. However, said film 60 must not meet the stringent requirement of a minimal thickness as must electrical insulation film 44 since there is nothing critical about the thermal resistance of heat flowing into the atmosphere from the electric heater. The adhesive layer 62, however, must still meet the stringent requirements of adhesive layers 46 and 47 concerning the temperature withstanding range of 70° to 500° F. An additional thermal insulation layer 64 may be fastened over the outer surface of electrical insulation film 60 to lessen the danger of burns to personnel or anything which may come in contact therewith. Any thermal insulation which will sufficiently lower the temperature at the outer surface of electrical insulation film 60 to an acceptable condition may be used for the thermal insulation.

Thus, by using the heat funneling principle twice, first by applying a low heat flux over a large input surface such as the major surfaces of the body and funneling the heat into the heat conducting cross-sectional area of the body at a higher heat flux, and secondly, by funneling the heat from the heat conducting cross-sectional area of the body to the heat output work-contacting contacting area, heat fluxes as large as 50 kw./ft.$^2$ can be attained at the heat output work-contacting area. Also, by keeping the thermal resistance of the electrical insulation and adhesive layers between the foil heater and the body, and the resistance through the body and through the abrasion resistant layer at the work-contacting area as low as possible, and thereby, also keeping the temperature gradient thereacross low, the heater can be operated near the temperature of Said work-contacting area which is at a predetermined operating value. Said low thermal resistances also aid in controlling the temperature at the output work-contacting surface since such low thermal resistance means that comparatively small changes in temperature gradient follow large changes in energy demand at the work surface. Also, by utilizing the proportional controller to make corrections in the power supplied to the heater depending upon the need, a fixed temperature, rapid response high energy heating device is attained.

I claim:

1. A fixed temperature, rapid response, heating device having a heat flux output in the range of 10 to 50 kw./ft.$^2$, comprising a generally rectangular bar-shaped body having its width dimension parallel to the direction of heat flow through said body and perpendicular to the cross-sectional area of said body as defined by its length and thickness, said body having a width:thickness ratio in the range of 1:1 to 5:1 and having a thermal conductivity at least 1,000 B.t.u.–in./hr.-ft.$^2$– F., a serpentine foil electric heater substantially covering at least the major surfaces of said body for supplying heat thereto, an electrically insulating film positioned between and adhesively secured to said foil heater and said body, the total thickness of the film and adhesive layers bearing a ratio to the effective thermal conductivity of said layers in the range of 0.0002 to 0.02 hr.-ft.$^2$–° F./B.t.u. a heat output work-contacting area, smaller than the cross-sectional area, along one longitudinal edge of said body, a temperature detecting means embedded in said body, and a proportional controller means responsive to changes in said temperature detecting means adapted to vary the power input to said foil heater to maintain a fixed temperature at said output area.

2. The heating device of claim 1 wherein said body is copper.

3. The heating device of claim 2 wherein said copper body is chromium plated to control the oxidation of said copper body.

4. The heating device of claim 1 wherein an abrasion resistant layer is fastened to the output work-contacting area, said abrasion resistant layer, including said fastening means therefor, having a thickness to thermal conductivity ratio in the range of 0 to 0.005 hr.-ft.$^2$–° F./B.t.u.

5. The heating device of claim 4 wherein said abrasion resistant layer comprises replaceable tungsten carbide.

6. The heating device of claim 1 wherein said serpentine electric heater is stainless steel foil.

7. The heating device of claim 1 wherein said electrically insulating film is a polyimide film.

8. The heating device of claim 1 including an electrical insulating film adhesively bonded to the outer surface of said foil heater to lessen the danger of electrical shocks from said foil heater and further including a thermal insulation layer fastened over said electrical insulating film of said foil heater to lessen the danger of burns from said foil heater.

UNITED STATES PATENT OFFICE
CERTIFICATE OF CORRECTION

Patent No. 3,569,665      Dated March 9, 1971

Inventor(s) Natheniel E. Hager, Jr.

It is certified that error appears in the above-identified patent and that said Letters Patent are hereby corrected as shown below:

Column 2, line 75, "special" should be --spacial--. Column 3, line 21, "B.t.u.-in./R)-ft.$^2$-F." should be --Btu-in./hr-ft$^2$-$°$F--; line 39, "may be of the" should be --may be any of the--; line 71, "011617" should be --#11617--; line 72, before "DuPont" insert --of--. Column 4, line 5, "0281" should be --#281--; line 17, change "fol-" to --following relationship:--; line 18, change the formula to: $k_{eff} = d_{total}/(d_1/k_1 + d_2/k_2 + d_3/k_3 + \ldots d_n/k_n)$--; line 19, delete "n)"; line 21, "47 and 47" should be --46 and 47--. Column 5, line 3, before "nearly" insert --is--; line 11, "termal" should be --thermal--. Column 6, line 14, delete "contacting" (second occurrence line 22, "Said" should be --the--.

Signed and sealed this 26th day of October 1971.

(SEAL)
Attest:

EDWARD M. FLETCHER, JR.　　　　　　ROBERT GOTTSCHALK
Attesting Officer　　　　　　　　　　Acting Commissioner of Pat